(12) United States Patent
Lemon et al.

(10) Patent No.: US 6,266,980 B1
(45) Date of Patent: Jul. 31, 2001

(54) CENTERLINE PROTECTION USING HEAVY INERT GASES

(75) Inventors: Lisa N. Lemon; Stephen T. Wiggs, both of Wilmington, NC (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/429,405

(22) Filed: Oct. 28, 1999

(51) Int. Cl.$^7$ .................................................. C03B 37/018
(52) U.S. Cl. ................................ 65/414; 65/399; 65/416; 65/421; 65/424; 65/426; 65/900
(58) Field of Search ............................. 65/399, 414, 416, 65/421, 424, 426, 900

(56) References Cited

U.S. PATENT DOCUMENTS

| | | |
|---|---|---|
| 3,711,262 | 1/1973 | Keck et al. . |
| 3,737,292 | 6/1973 | Keck et al. . |
| 3,823,995 | 7/1974 | Carpenter . |
| 3,868,170 | 2/1975 | DeLuca . |
| 3,884,550 | 5/1975 | Maurer et al. . |
| 3,933,454 | 1/1976 | DeLuca . |
| 4,125,388 | 11/1978 | Powers . |
| 4,157,906 | 6/1979 | Bailey . |
| 4,286,978 | * 9/1981 | Bailey et al. ........................... 65/426 |
| 4,453,961 | 6/1984 | Berkey . |
| 4,643,751 | * 2/1987 | Abe . |
| 4,684,383 | 8/1987 | Cavender, Jr. et al. . |
| 5,055,121 | * 10/1991 | Kanamori et al. ..................... 65/426 |
| 5,203,898 | * 4/1993 | Carpenter et al. ..................... 65/421 |
| 5,609,666 | * 3/1997 | Heitmann .............................. 65/424 |

FOREIGN PATENT DOCUMENTS

| | | |
|---|---|---|
| 3635819 | 5/1988 | (DE) . |
| 11-255533 | 9/1999 | (JP) . |
| WO 98 18733 | 5/1998 | (WO) . |

OTHER PUBLICATIONS

Patent Abstracts of Japan—JP 11–255533, Fujikura Ltd., Sep. 21, 1999.

* cited by examiner

Primary Examiner—Michael P. Colaianni
(74) Attorney, Agent, or Firm—Randall S. Wayland

(57) ABSTRACT

Disclosed is a method of minimizing re-wetting of a preform upon removal of the preform from the consolidation furnace and producing core cane and/or optical fiber therefrom. During removal, the consolidated preform and, in particular, the centerline aperture is exposed to a heavy inert gas, such as Argon, Krypton or Xenon. This reduces the amount of re-wetting thereby concomitantly improving attenuation of the optical fiber produced therefrom. This method produces beneficial attenuation reductions in the 1383 nm wavelength region.

13 Claims, 4 Drawing Sheets

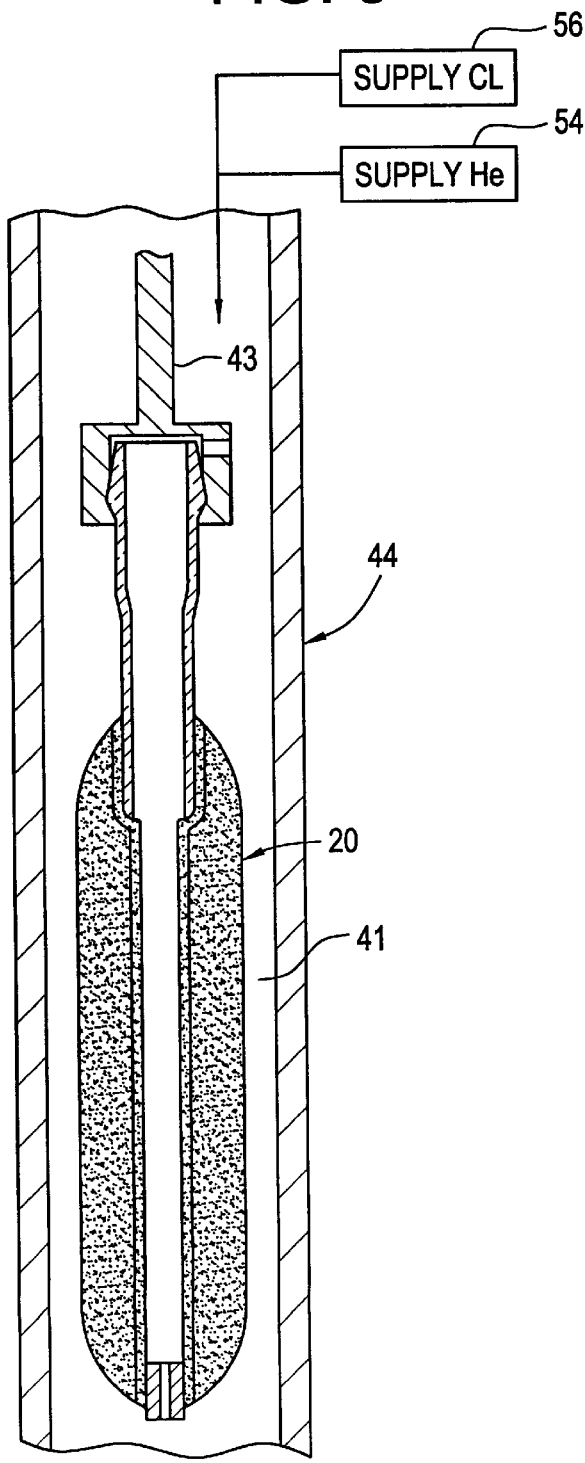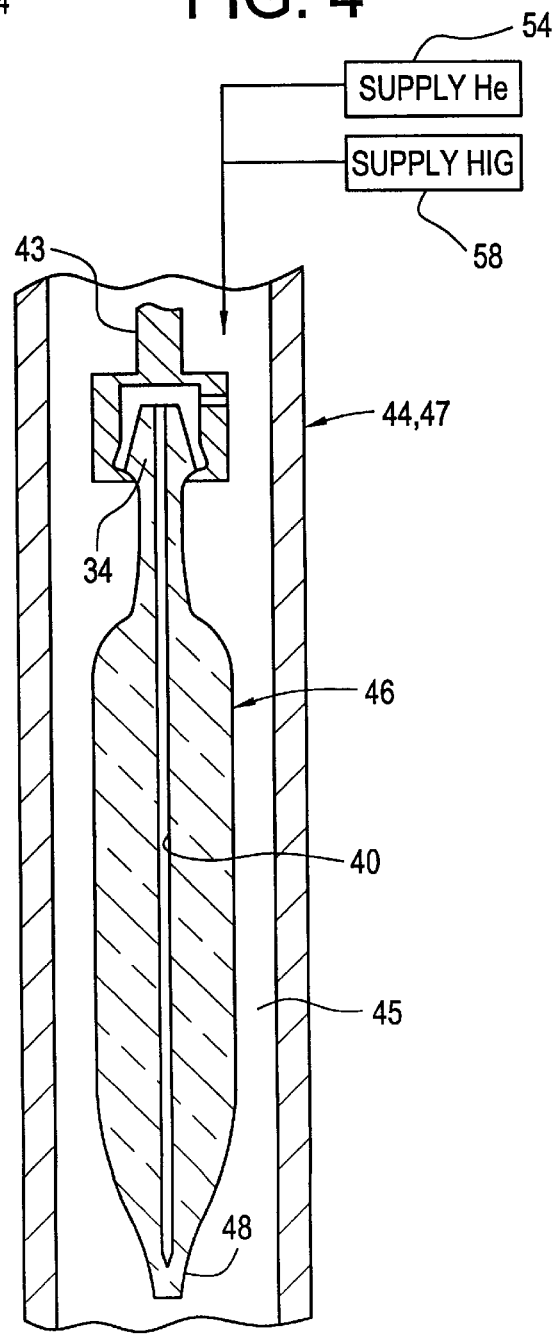

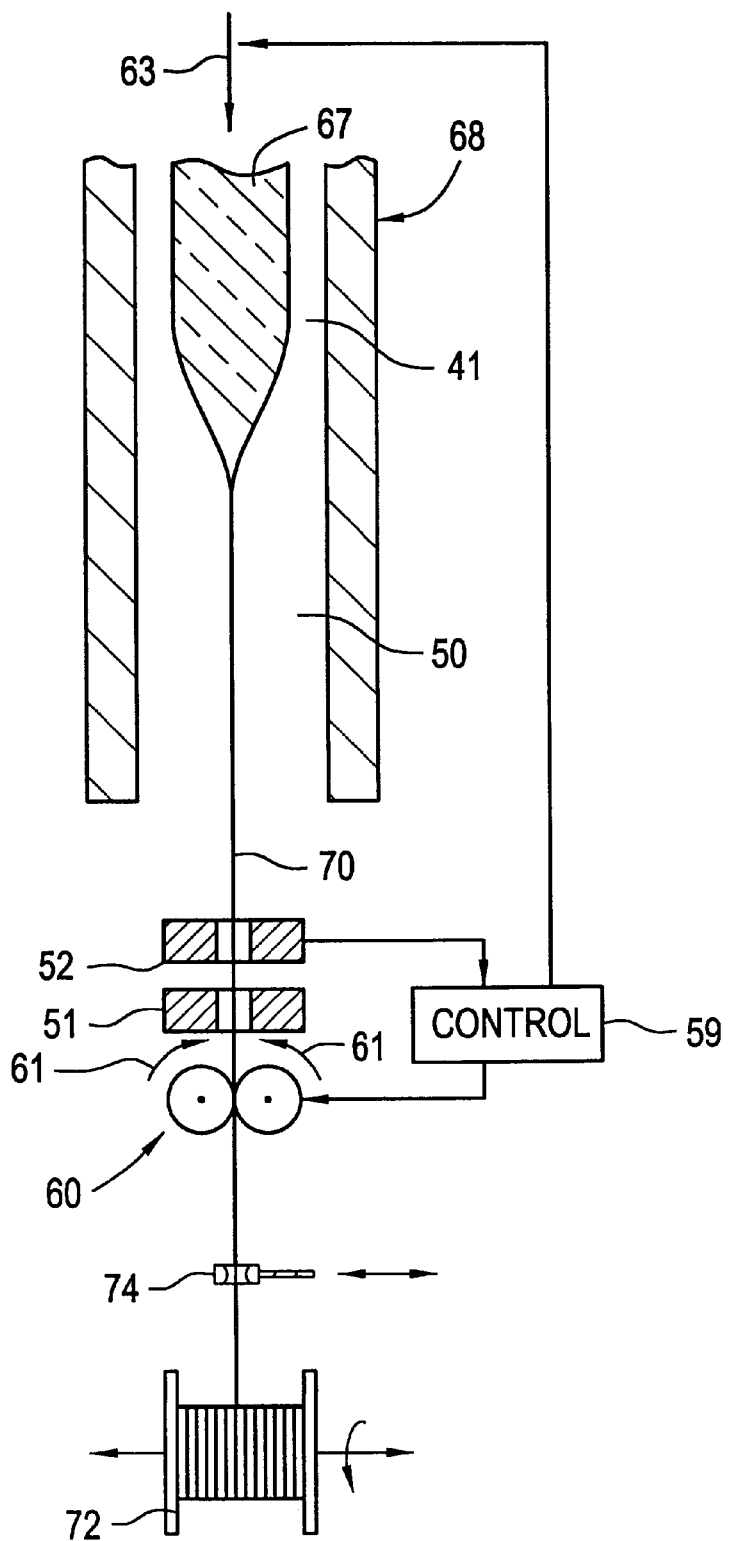

CENTERLINE PROTECTION USING HEAVY INERT GASES

FIELD OF THE INVENTION

The present invention relates generally to consolidated glass preforms, and methods for fabricating preforms, core cane and optical fiber, and more particularly to a method of minimizing re-wetting of a preform following consolidation thereof.

BACKGROUND OF THE INVENTION

Processing of consolidated high-purity glass preforms into core cane (otherwise referred to as a blank) is well known in the art. A glass soot, which may include suitable doping, is deposited, for example, by a flame hydrolysis process upon a rotating substrate such as an alumina mandrel. Various methods of flame hydrolysis are described in U.S. Pat. Nos. 3,737,292, 3,823,995 and 3,884,550. The core portion of the soot preform is formed by introducing various gasses in predetermined amounts into a burner flame. This introduction produces oxides that include, for example silicon oxide and germanium oxide. These oxides deposit on the rotating mandrel until the appropriate diameter of the core portion is reached. The oxides may be introduced in various percentages, as desired, to produce various core refractive index profiles as described, for example, in U.S. Pat. No. 3,823,995. The core portion, once formed, is then generally overclad with $SiO_2$ until a final soot preform diameter is reached. As is well understood, the overclad portion, once consolidated, exhibits a refractive index lower than that of the core. Alternately, the refractive index differences may be achieved by down dope cladding.

Upon completion of the flame hydrolysis process, preferably by an Outside Vapor Deposition (OVD) process, the mandrel with deposited soot is removed from the OVD lathe. Typically, a handle portion is included on the preform and is integral therewith. The mandrel is then removed from the preform thereby leaving a soot preform having an aperture extending along its axial length and positioned at the preform's centerline. The aperture then has a silica plug-like member inserted at its lower end. Subsequently, the preform is inserted into and held in a consolidation furnace. First, chlorine gas is included within the muffle portion of the furnace to aid in water removal from the preform. In particular, chlorine permeates the interstices of the soot preform and flushes out any OH, $H_2$ or $H_2O$ contained therein. The preform is then heated at a high temperature (generally in the range of between about 1450° C. to about 1600° C., depending upon preform composition) until the deposited soot consolidates and transforms into a solid, high-purity glass having superior optical properties. Typically, the preform is subjected to gradient consolidation, a technique taught in U.S. Pat. No. 3,933,454 whereby the bottom tip is consolidated first; the consolidation continuing up the preform until completed. It should be recognized that during consolidation, the silica plug-like member combines with and completely seals the lower end of the preform.

As is known to those of ordinary skill in the art, any OH, $H_2$ or $H_2O$ included in the consolidated preform or the intermediate core cane may degrade the optical properties of the resultant optical fiber produced therefrom. Reductions of even small amounts of retained OH, $H_2$ or $H_2O$ can have substantial benefits in terms of dB/km losses (attenuation) in the resulting optical fiber produced. OH, $H_2$ or $H_2O$ content along the centerline aperture is particularly problematic because, for example, in most optical fibers, the maximum field strength of the optical signal occurs at or near the centerline. Therefore, reductions of OH, $H_2$ or $H_2O$ present in the preform results in reduced system cost to the end optical fiber user because optical componentry, such as regenerators, amplifiers and the like can be spaced further apart. Therefore, removal of OH, $H_2$ or $H_2O$ is a significant problem in optical fibers.

Once the preform is consolidated, it is removed from the furnace and transferred to an argon-filled holding vessel. Next, the preform is drawn, under a vacuum, to close the centerline aperture and stretch the preform into a core cane of constant diameter as is known to those of skill in the art. The core cane is then cut into segments, each of which is then again overclad with $SiO_2$ soot to an appropriate diameter and again consolidated thereby resulting in a preform which is apertureless. The resulting preform is then transferred to a drawing furnace to draw the optical fiber.

One of the problems encountered during the removal of the preform from the core consolidation furnace is re-wetting of the centerline portion, i.e., the aperture. "Re-wetting" as referred to herein means that OH, $H_2$ or $H_2O$ is re-dispersed, diffused, or otherwise deposited on or into the consolidated glass. The mechanism of re-wetting is accomplished as the preform is removed from the furnace. Air replaces the gas present in the aperture due to buoyancy and temperature gradient effects. Because of the humidity present in the air, OH, $H_2$ or $H_2O$ re-disperse, diffuse, or otherwise deposit on or into the consolidated preform, and most problematically at its centerline. In particular considerable effort has been spent on methods of reducing re-wetting in glass preforms as any resulting improvement in attenuation translates into lower system cost to the end-user. These efforts, although successful, have resulted in additional steps and expense.

Thus, there is a need for a simple and cost-effective method that reduces the amount of re-wetting of the consolidated preform subsequent to consolidation.

SUMMARY OF THE INVENTION

In accordance with the invention, an improved method is provided for manufacturing a consolidated preform. The method in accordance with the invention minimizes re-wetting of a consolidated preform. More particularly, the method minimizes re-wetting of a centerline aperture in the preform subsequent to consolidation, for example, upon removal from the consolidation furnace. The method has utility for minimizing re-wetting of the preform thereby enabling production of higher quality, lower attenuation optical fibers.

In accordance with another aspect of the invention, a method of manufacturing a consolidated preform is provided comprising a step of continuously exposing a centerline aperture of a consolidated preform to a heavy inert gas between removal from the consolidation furnace and during transfer to another vessel (e.g., a holding vessel) to minimize re-wetting of the centerline aperture. Most preferably, the heavy inert gas is Argon, Krypton or Xenon. The heavy inert gas is most preferably retained within the centerline aperture up until the point at which the aperture is closed.

Advantageously, the heavy inert gas may be first introduced during a finishing phase in the consolidation furnace. Upon removal from the furnace, the preform is held in an upright orientation such that the heavy inert gas remains in the centerline aperture. Next, the consolidated preform may be transferred to a holding vessel also comprising a heavy inert gas. Thus, because the aperture is filled with the heavy inert gas whilst being transferred from the furnace to the holding vessel, re-wetting of the centerline aperture is minimized as the heavy inert gas acts as a shield preventing air infiltration.

From the holding vessel, the consolidated preform may be utilized to produce a core cane whereupon the centerline aperture is closed, under a vacuum, during the step of drawing the core cane. The resulting core cane segments are again overclad, and again consolidated to produce a second consolidated preform. From this second preform, an optical fiber may be drawn.

In a more detailed aspect of the invention, a method of manufacturing an optical fiber preform is provided comprising a soot preform including a centerline aperture including a plug member at a lower end thereof, consolidating the soot preform in a furnace, subjecting the preform to a heavy inert gas to purge any other gas present in the centerline aperture, and removing the preform whilst continuing to expose the centerline aperture to the heavy inert gas.

Other aspects of the invention will be understood with reference to the following detailed description, claims and appended drawings.

BRIEF DESCRIPTION OF THE FIGURES

FIG. 3 is a schematic illustration of a soot preform positioned within a consolidation furnace.

FIG. 4 illustrates a first consolidated preform shown in side cross section.

FIG. 8 is a schematic illustration of a method for producing an optical fiber.

DETAILED DESCRIPTION OF THE INVENTION

Figure 1:
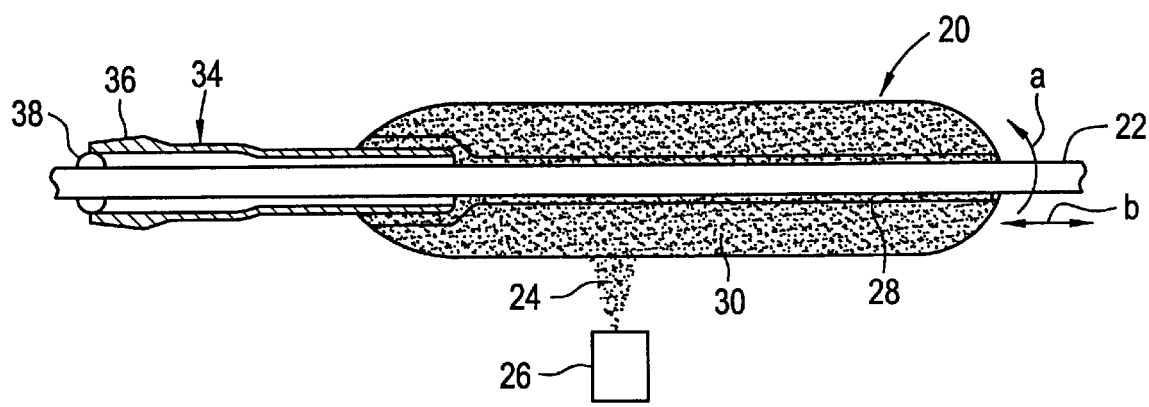
FIG. 1 illustrates a soot preform being formed by an OVD process shown in side cross section.

Reference will now be made in detail to the present preferred embodiment of the invention with reference to the drawings. Wherever possible, the same reference numerals shall be used throughout to refer to the same or like parts. A first step in the method of manufacturing a consolidated preform in accordance with the invention is illustrated in FIG. 1. wherein a soot preform 20 is formed by a vapor deposition or flame hydrolysis process on a substantially cylindrical, tapered alumina mandrel 22. The soot preform 20 comprises a core layer 28 and a clad layer 30 as is known to those of ordinary skill in the art. The core and clad layers 28,30 are deposited by introducing various gasses into a burner 26 (e.g., $H_2$, $O_2$, $SiCl_4$, $GeCl_4$) to produce various oxide soot deposits 24 (e.g., $SiO_2$ and $GeO_2$) on portions of the preform 20. The mandrel 22 and the preform 20 are simultaneously rotated and translated back and forth to deposit uniform layers of soot as indicated by the arrows a and b. Alternatively, the burner 26 may be traversed while the mandrel 22 is rotated. A handle 34 is provided over the mandrel 22 at one end thereof and includes an enlarged portion 36 that is used throughout the preform processing for gripping the preform 20. A suitable spacer 38 holds the handle relative to the mandrel prior to application of the soot.

Figure 2:
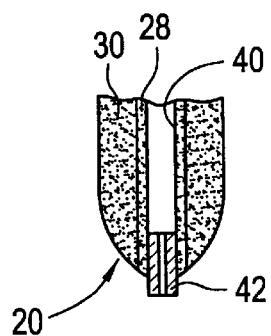
FIG. 2 illustrates a lower end portion of the soot preform being plugged with a glass insert.

Following the soot application step, the mandrel 22 is removed thereby forming a central aperture 40 extending along the centerline of the preform 20. The final preform 20 which includes core and clad layers 28, 30 has a pure silica member 42 inserted in its lower end as shown in FIG. 2 in an end opposite from the handle 34 (only the lower portion of the preform is shown). The silica member, upon consolidation, will plug the lower end of the preform.

Next, as best illustrated in FIG. 3, a holder 43 (only a portion is shown) is attached to the soot preform 20 and the preform is inserted into a hot zone 41 of a furnace 44 as shown in FIG. 3. The soot preform 20 is dried by exposure to various gasses, for example, a chlorine gas supplied from supplies 56 for a suitable time at approximately 900–1200° C. Next, the preform 20 is heated and consolidated in, for example, a Helium environment supplied from supply 54 at an elevated temperature of, for example, between about 1450° C. to about 1600° C. for a suitable time as shown in FIG. 4. After the consolidation step, the consolidated preform 46 having its lower end 48 completely sealed is pulled to the top portion 45, i.e., the uppermost portion of the furnace 44, which is at a constant temperature of approximately between about 900° C. and 1200° C. The consolidated preform 46 is allowed to cool for approximately 30–60 minutes while, at the same time, being exposed to a Heavy Inert Gas (hereinafter "HIG"), such as, for example, Argon, Xenon, or Krypton. The HIG 58 is introduced into the furnace chamber in a conventional manner, in the same way the Helium and Chlorine gases were earlier introduced. Buoyancy forces as well as temperature gradients cause the Helium or other gases present in the aperture 40 to purge from it and then refill with the HIG. By the term HIG, it is meant any noble gas heavier than Nitrogen.

Next, the consolidated preform 46 is removed from the furnace 44 via the holder 43 and is transferred in an upright position to a holding vessel 47. For simplicity, the schematic of FIG. 4 is being used to represent the furnace 44 and the holding vessel 47. However, it should be recognized that these may be separate members in production. The holding vessel 47 is set to an approximate temperature of between about 600° C. and about 900° C., and most preferably at about 600° C. Because the HIG is heavier than air, little if any air will reenter into the aperture 40 whilst being transported. Thus, re-wetting of the aperture 40 of the preform 46 and general exposure to water is minimized. If any air intrusion does occur into the aperture 40, it is likely to be at an innocuous point near the handle 34 where, if contaminated, it will not effect the optical fiber produced therefrom. The reason is that the handle portion 34 is generally not used to produce viable fiber. Alternatively, the top end of the preform may be sealed to seal in the HIG.

Figure 5:
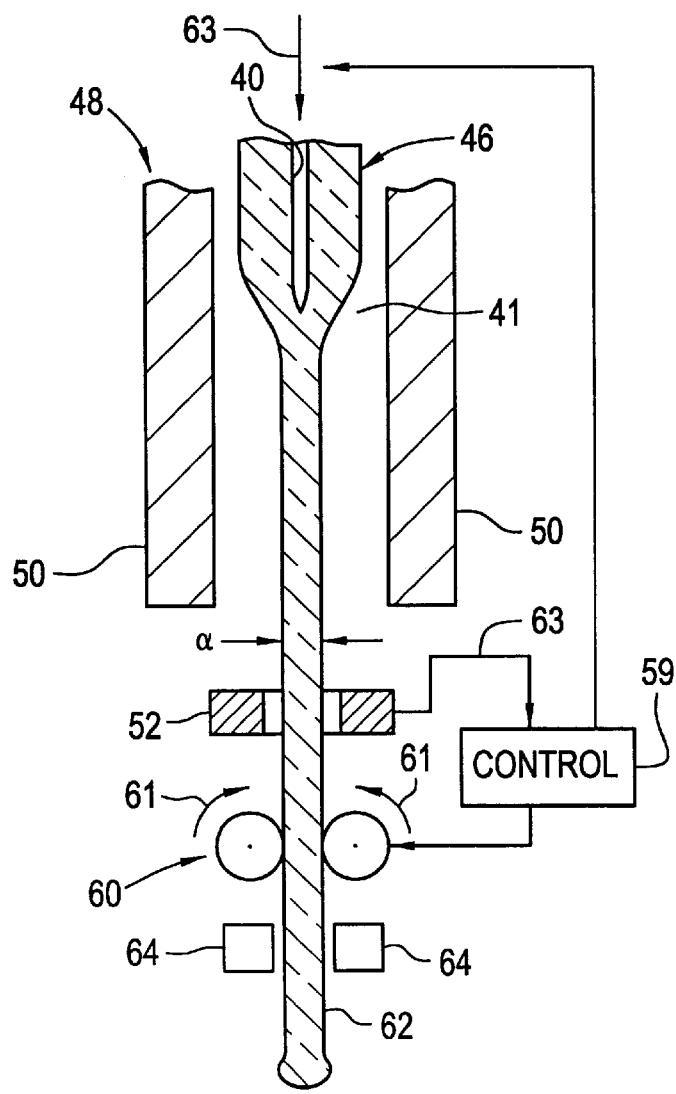
FIG. 5 is a schematic illustration of a method for producing core cane segments.

From this point, a one step draw may be practiced wherein an optical fiber is drawn directly from the consolidated preform 46 as is described in U.S. Pat. No. 3,711,262. Moreover, the transfer may be directly to the drawing furnace comprising the second vessel. More preferably, as shown in FIG. 5, the consolidated and cooled preform 46 is removed from the holding vessel 47 and inserted into a redraw furnace 48 where it is heated to a temperature of between about 1800° C. and 2100° C. in a hot zone. As the preform 46 is lowered into the hot zone 41, a strand of molten glass drops from the preform 46 and passes through a cooling section 50. A vacuum is applied to the top end (not shown) of the preform 46 to aid in closure of the aperture 40.

Figure 6:
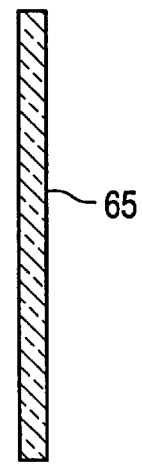
FIG. 6 illustrates a core cane segment shown in a side cross section.

Non-contact measurement device 52 positioned below the furnace 48 measures the diameter d of the continuous cane 62 exiting from the redraw furnace 48. The continuous cane 62 is fed through a set of tractor wheels 60 that provide suitable force to draw the appropriate diameter d of continuous cane 62. Appropriate control 59 which may, for example, control the down feed rate (as indicated by arrow 63), the draw speed (indicated by arrows 61) of tractor wheels 60 or other factors is provided. Input to the control 59 is the diameter of the continuous cane 62 based upon the data supplied by non-contact sensor 52 in line 63. Other inputs may also be provided. Upon a predetermined length of continuous cane 62 passing through the tractor wheels, a cutter 64, such as a flame torch, is activated and cuts the continuous cane 62 into predefined-length, core cane segments 65 as shown in FIG. 6.

Figure 7:
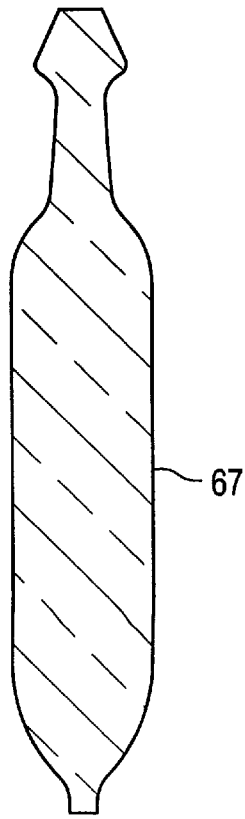
FIG. 7 illustrates a second consolidated preform shown in a side cross section.

Individual cane segments 65 are again overclad with $SiO_2$ using the well-known OVD process (e.g., as illustrated in FIG. 1) and then dried and consolidated as previously described herein. This provides a second consolidated preform 67 wherein the aperture is completely closed, as shown in FIG. 7. This second consolidated preform is a complete optical fiber preform, with the entire core and clad regions necessary for drawing into an optical fiber. This second preform 67 is then inserted into a draw furnace 68, as illustrated in FIG. 8, for producing a high-quality optical fiber 70 exhibiting improved attenuation properties. More particularly, the preform 67 is heated in a hot zone 41 of the furnace 68 between 1800° C. and 2100° C. until a thin strand of glass fiber drops from the second preform 67. The fiber 70 is cooled in cooling zone 50 and extends through a non-contact sensor 52 to verify the diameter thereof. Next, an abrasion resisting coating, such as a urethane acrylate coating is applied by one or more coaters 51. Typically, the coating is cured by a suitable curing device (not shown) which utilizes, for example, ultra-violet radiation. Draw of the fiber 70 is accomplished through a set of tractor wheels 60 that rotate in contact with the fiber 70. The down feed rate 63, fiber draw rate 61, and other factors are controlled via a suitable control 59 to produce a uniform optical fiber with a diameter of about 125 microns (uncoated) and about 250 microns (coated). The fiber 70 is then wound onto a rotating spool 72. A fiber director 74 traverses back and forth (as indicated by arrow 75) to ensure the fiber 70 is uniformly distributed on the spool 72.

It should be recognized, although the OVD method of manufacture of the preform including an aperture is preferred, the present invention will work with any preform including an aperture produced by any suitable method, such as an Inside Vapor Deposition (IVD) method or Modified Chemical Vapor Deposition (MCVD) method. Moreover, the method will work to facilitate transfer from the consolidation process to a second vessel.

Table 1 illustrates the attenuation differences that are obtained when the re-wetting of the aperture centerline 40 (FIG. 4) is minimized in accordance with the present invention. As is apparent, by filling the centerline aperture with a HIG after consolidation, and maintaining the HIG in the aperture until the aperture is closed, the attenuation is reduced by about 7.7%. Such filling of the centerline can be achieved, for example, during the last stages in the furnace when the consolidated preform is in the finishing phase. At this point, the chamber and, thus, the centerline 40 of the consolidated preform 46 are purged with a HIG such as Argon. The improved optical properties provided by the present invention beneficially translates into being able to have larger intervals between regenerator components.

TABLE 1

| Attenuation Results | |
| --- | --- |
| Helium | Argon |
| 0.403 dB/km | 0.372 dB/km |

It will be apparent to those of ordinary skill in the art that various modifications and variations can be made to the present invention without departing from the scope of the invention. Thus, it is intended that the present invention cover the modifications and variations provided they come within the scope of the appended claims and their equivalents.

We claim:

1. A method of manufacturing a consolidated preform comprising the step of:

continuously exposing a centerline aperture of a consolidated preform to a heavy inert gas between removal from a consolidation furnace and transfer to a second vessel to minimize re-wetting of the centerline aperture.

2. The method of claim 1 wherein the heavy inert gas is selected from a group consisting of Argon, Krypton, and Xenon.

3. The method of claim 1 wherein the step of exposing takes place during a finishing phase in the consolidation furnace where the preform is pulled adjacent to the top of the furnace for cooling.

4. The method of claim 3 wherein the heavy inert gas remains in the centerline aperture upon removal from the furnace due to its buoyancy.

5. The method of claim 1 wherein the consolidated preform is removed from the consolidation furnace and the centerline aperture remains in an upright position.

6. A method of manufacturing an optical fiber preform comprising:

providing a soot preform including a centerline aperture, consolidating the soot preform in a furnace to produce a consolidated preform, subjecting the consolidated preform to a heavy inert gas to purge any other gas present in the centerline aperture, removing the consolidated preform from the furnace whilst continuing to expose the centerline aperture to the heavy inert gas, and moving the consolidated preform towards a separate vessel for further processing wherein re-wetting of the centerline aperture is minimized, thereby forming the optical fiber preform.

7. A method of manufacturing a consolidated optical fiber preform comprising the step of:

continuously exposing a centerline aperture of a consolidated preform to a heavy inert gas from the point at which the preform is consolidated, during removal from a consolidation furnace and during transit to a point where the aperture is closed wherein re-wetting of the centerline aperture is minimized.

8. A method of manufacturing an optical fiber comprising:

providing a soot preform including a centerline aperture, inserting the soot preform in a furnace, consolidating the soot preform to form a consolidated preform, subjecting the consolidated preform to a heavy inert gas to purge any other gas contained in the centerline aperture, removing the consolidated preform from the furnace whilst continuing to subject the centerline aperture to a heavy inert gas thereby minimizing re-wetting of the aperture centerline, and producing an optical fiber from consolidated preform.

9. A method of manufacturing an optical fiber comprising:

providing a soot preform including a centerline aperture, inserting the soot preform in a furnace, consolidating the soot preform to form a consolidated preform, cooling the consolidated preform to a temperature between about 900° C. and 1200° C., subjecting the consolidated preform to a heavy inert gas to purge any other gas contained in the centerline aperture, removing the consolidated preform from the furnace whilst continuously exposing the centerline aperture to a heavy inert gas, placing the consolidated preform in a holding vessel comprising a heavy inert gas, and producing an optical fiber from the consolidated preform.

10. A method of manufacturing a core cane from a consolidated preform comprising the steps of:

continuously exposing a centerline aperture of a consolidated preform to a heavy inert gas between removal from a consolidation furnace and transfer to a drawing furnace to minimize re-wetting of the centerline aperture, and placing the consolidated preform into the drawing furnace and drawing a core cane therefrom.

11. A method of manufacturing an overclad preform comprising the steps of:

continuously exposing a centerline aperture of a consolidated preform to a heavy inert gas between removal from a consolidation furnace and transfer to a drawing furnace to minimize re-wetting of the centerline aperture, placing the consolidated preform into the drawing furnace and drawing a core cane therefrom, and overcladding the core cane.

12. A method of manufacturing a second consolidated preform comprising the steps of:

continuously exposing a centerline aperture of a first consolidated preform to a heavy inert gas between removal from a consolidation furnace and transfer to a drawing furnace to minimize re-wetting of the centerline aperture, placing the first consolidated preform into the drawing furnace and drawing a core cane therefrom, overcladding the core cane to form an overclad preform, and consolidating the overclad preform to form the second consolidated preform.

13. A method of manufacturing an optical fiber comprising the steps of:

continuously exposing a centerline aperture of a first consolidated preform to a heavy inert gas between removal from a consolidation furnace and transfer to a drawing furnace to minimize re-wetting of the centerline aperture, placing the first consolidated preform into the drawing furnace and drawing a core cane therefrom, overcladding the core cane to form an overclad preform, and consolidating the overclad preform to form a second consolidated preform, placing the second consolidated preform in a drawing apparatus and drawing an optical fiber therefrom.

* * * * *